(12) United States Patent
Adachi

(10) Patent No.: US 7,456,682 B2
(45) Date of Patent: Nov. 25, 2008

(54) DEMODULATOR AND PHASE COMPENSATION METHOD THEREOF

(75) Inventor: Takahiro Adachi, Tokyo (JP)

(73) Assignee: NEC Corporation, Tokyo (JP)

( * ) Notice: Subject to any disclaimer, the term of this patent is extended or adjusted under 35 U.S.C. 154(b) by 337 days.

(21) Appl. No.: 11/355,265

(22) Filed: Feb. 15, 2006

(65) Prior Publication Data
US 2006/0189295 A1 Aug. 24, 2006

(30) Foreign Application Priority Data
Feb. 23, 2005 (JP) ............................. 2005-047070

(51) Int. Cl.
H03D 3/22 (2006.01)
H04L 27/227 (2006.01)
(52) U.S. Cl. ...................... 329/308; 329/304
(58) Field of Classification Search ................. 329/308, 329/304
See application file for complete search history.

(56) References Cited

U.S. PATENT DOCUMENTS 4,871,973 A * 10/1989 Yoshihara .................... 329/308
5,440,268 A * 8/1995 Taga et al. .................... 329/308
6,411,658 B1 6/2002 Sasaki

FOREIGN PATENT DOCUMENTS

JP 2002-111766 4/2002

* cited by examiner

*Primary Examiner*—Joseph Chang
(74) *Attorney, Agent, or Firm*—Scully, Scott, Murphy & Presser, P.C.

(57) ABSTRACT

The exemplary demodulator of the present invention can eliminate effectively a phase fluctuation which cannot be fully eliminated by a carrier recovery loop (feedback loop), with subsequent feed-forward phase compensation loop which shares a phase detector of the carrier recovery loop. A carrier recovery loop receives a digital signal after a semi-synchronous detection, detects a phase shift of the digital signal to a predefined phase position in rectangular coordinate, and compensates for the phase of the received digital signal by a first compensation value on the basis of the detected phase shift to generate an output signal. A feed-forward phase compensation loop generates an average value of the phase shift, and compensates for the phase of the output signal by a second compensation value on the basis of the averaged phase shift value.

7 Claims, 4 Drawing Sheets

DEMODULATOR AND PHASE COMPENSATION METHOD THEREOF

BACKGROUND OF THE INVENTION

1. Field of the Invention

The present invention relates to a demodulator and phase compensation method, and more particularly, to a demodulator and phase compensation method capable of reducing effectively phase fluctuation incidental on semi-synchronous detection in a digital radio communication.

2. Description of the Related Art

Heretofore, semi-synchronous detection is used as a demodulator of a digital radio communication. In the semi-synchronous detection, since a local oscillation (LO) frequency is not completely identical to a carrier frequency of a received signal, phase rotation (phase fluctuation) according to these frequency differences remains in a base-band signal after demodulation.

If the phase rotation remains, a transmitting data can not be recovered correctly (demodulation errors occur). Correspondingly, as technology of eliminating this phase rotation, a carrier recovery loop is used in general.

However, in the conventional carrier recovery loop, there is a problem that the phase rotation cannot fully be eliminated.

As an example which solves such a problem, there is a demodulator which includes a phase compensation loop (feed-forward loop) of cascade arrangement in addition to the conventional carrier recovery loop (feedback loop) (see, JP 2002-111766).

The conventional demodulator detects how much a demodulated signal with output side of the carrier recovery loop is shifted from a predefined phase position in rectangular coordinate, in the feed-forward phase compensation loop, and compensates for rapid phase fluctuation which takes place at the time of line switching to backup line from active line. That is, the conventional demodulator eliminates the rapid phase fluctuation which cannot be eliminated by the carrier recovery loop with subsequent feed-forward phase compensation loop.

Operation of the conventional demodulator is performed so that a phase detector detects the phase fluctuation at the time of line switching and an endless phase shifter adds reverse phase rotation to the demodulated signal with the phase compensation value to compensate for the phase fluctuation.

However, phase detector output contains generally a noise component (phase noise) incidental on phase detector itself regardless of phase fluctuation of the received signal. Therefore, in the state where there is no line switching, while the feed-forward phase compensation loop has been in a state of operation, the phase noise remains and there is a problem of degrading the demodulation characteristic on the contrary.

Here, a relation between loop bandwidth and carrier-to-noise power ratio (C/N) in a carrier synchronous operation limit is explained. FIG. 3 is a diagram showing a relation between loop bandwidth and carrier-to-noise power ratio (C/N) in carrier synchronous operation limit.

Referring to FIG. 3, as responsivity to the received signal becomes slow (loop bandwidth is narrow), C/N degradation by carrier jitter (fluctuation) decreases, and a carrier synchronization can be hold to a low C/N of a received signal. Meanwhile, as the responsivity to the received signal becomes fast (a loop bandwidth is wide), the phase noise is suppressed and C/N degradation by the carrier jitter becomes more dominant.

Next, a relation between loop bandwidth and C/N in a bit error rate (BER) characteristic is explained. FIG. 4 is a diagram showing a relation between loop bandwidth and carrier-to-noise power ratio (C/N) in bit error rate (BER) characteristic.

Referring to FIG. 4, as well as FIG. 3, as loop bandwidth narrows, an influence of carrier jitter becomes small. Meanwhile, as loop bandwidth is wide, C/N degradation by phase noise becomes small, but C/N degradation by the carrier jitter becomes large on the contrary.

According to the above explanation, when a loop bandwidth is narrow, a signal noise component received from the outside of a loop is suppressed, meanwhile, when a loop bandwidth is wide, a noise component generated within a loop is suppressed.

In the case of the conventional demodulator mentioned above, though the feed-forward phase compensation loop can compensate for the rapid phase fluctuation (demodulation errors) which takes place at the time of line switching to backup line from active line, there is no consideration to reducing the noise component (phase noise) incidental on phase detector itself.

Therefore, when the feed-forward phase compensation loop is effective in a state without line switching, the conventional demodulator mentioned above has the problem of degrading the demodulation characteristic on the contrary.

SUMMARY OF THE INVENTION

The present invention has been made to solve, the above and other exemplary problems, and therefore an exemplary feature of the present invention is to eliminate effectively a phase fluctuation which cannot be fully eliminated by a carrier recovery loop (feedback loop), with subsequent feed-forward phase compensation loop which shares a phase detector of the carrier recovery loop.

In order to attain the above-mentioned and other exemplary features, the present invention provides an exemplary demodulator. The demodulator includes: a carrier recovery loop which receives a digital signal after a semi-synchronous detection, detects a phase shift of the digital signal to a pre-defined phase position, and compensates for a phase of the received digital signal by a first compensation value on the basis of the detected phase shift to generate an output signal; and a feed-forward phase compensation loop which generates an average value of the detected phase shift, and compensates for a phase of a signal output from the carrier recovery loop by a second compensation value on the basis of the averaged phase shift.

Also, in order to attain the above-mentioned and other exemplary features, the present invention provides an exemplary phase compensation method. The phase compensation method includes: detecting a phase shift of a received digital signal after a semi-synchronous detection to a predefined phase position; compensating for a phase of the received digital signal by a first compensation value on the basis of the detected phase shift to generate an output signal; averaging an value of the detected phase shift; and compensating for a phase of a signal compensated with the first compensation value by a second compensation value on the basis of an averaged value.

Furthermore, in order to attain the above-mentioned and other exemplary features, the present invention provides an exemplary demodulator. The demodulator includes: a quadrature detector which converts a received signal to base-band signals of in-phase channel and quadrature-phase channel with multiplying by a local oscillation frequency; low-pass filters which eliminate high frequency components more unnecessary from the base-band signals; analog-to-digital converters (A/D) which convert the base-band signals after filtering into digital signals; a carrier recovery loop which detects a phase shift of the digital signals to a predefined phase position, and compensates for a phase of the digital signal by a first compensation value on the basis of the detected phase shift to generate an output signal; and a feed-forward phase compensation loop which generates an average value of the detected phase shift, and compensates for a phase of a signal output from the carrier recovery loop by a second compensation value on the basis of the averaged phase shift.

According to the above structure, the exemplary demodulator of the present invention can eliminate effectively a phase fluctuation which cannot be fully eliminated by a carrier recovery loop (feedback loop), with subsequent feed-forward phase compensation loop (feed-forward loop) which shares a phase detector of the carrier recovery loop.

BRIEF DESCRIPTION OF THE DRAWINGS

The above and other exemplary features, and advantages of the present invention will become more apparent from the following detailed description when taken in conjunction with the accompanying drawings wherein.

DETAILED DESCRIPTION OF THE EXEMPLARY EMBODIMENTS

Figure 1:
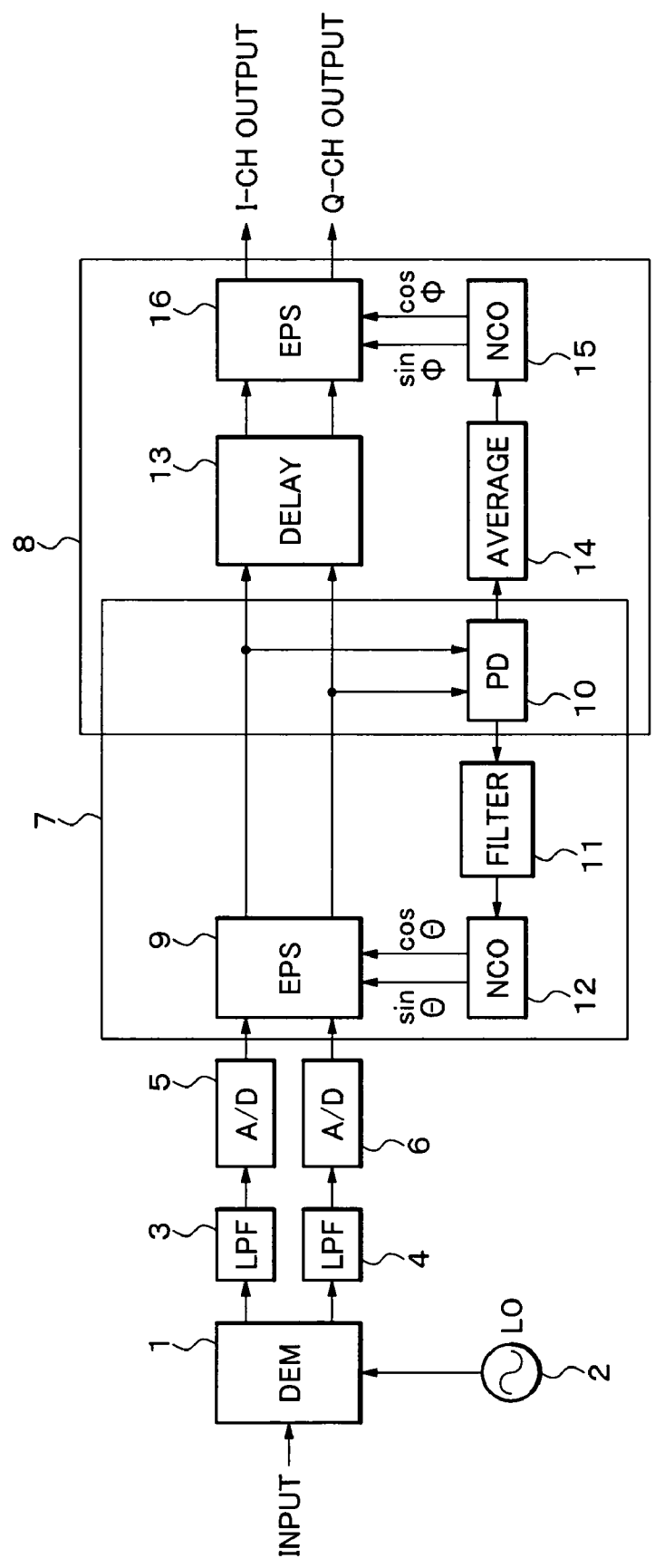
FIG. 1 is a block diagram showing a structure of a demodulator according to an exemplary embodiment of the present invention.

Hereinafter, a description will be given in more detail of an exemplary demodulator according to the present invention with reference to the accompanying drawings. FIG. 1 is a block diagram showing a structure of a demodulator according to an exemplary embodiment of the present invention.

Referring to FIG. 1, the demodulator according to the exemplary embodiment of the present invention includes a quadrature detector (DEM) 1, a local oscillator (LO) 2, low pass filters (LPF) 3 and 4, analog-to-digital converters (A/D) 5 and 6, a carrier recovery loop 7, a feed-forward phase compensation loop 8.

The carrier recovery loop 7 includes an endless phase shifter (EPS) 9, a phase detector (PD) 10, a loop filter 11, a numeric control oscillator (NCO) 12. Moreover, the feed-forward phase compensation loop 8 includes a delay circuit (DELAY) 13, an average circuit (AVERAGE) 14, a numerical control oscillator (NCO) 15, and an endless phase shifter (EPS) 16 in addition to the phase detector (PD) 10 contained in common.

Then, an operation of respective units of the demodulator according to this exemplary embodiment will be described with reference to the accompanying drawings.

Referring to FIG. 1, the quadrature detector (DEM) 1 converts the received signal of intermediate frequency (IF) to base-band signals of in-phase CH and quadrature-phase CH with multiplying by an output signal of the local oscillator 2, and supplies the base-band signals to the low pass filter 3 and 4, respectively.

The local oscillator (LO) 2 supplies a local oscillation signal of a frequency near (almost the same) a carrier frequency of the received signal to the quadrature detector 1.

Each of the low-pass filters (LPF) 3 and 4 eliminates high frequency component more unnecessary, that is, an added component after multiplication, from each base-band signals output from the quadrature detector 1 and supplies the base-band signals after filtering to analog-to-digital converters 5 and 6.

The analog-to-digital converters (A/D) 5 and 6 convert respectively output signals of low pass filters 3 and 4 into digital signals, and supply the digital signals to the endless phase shifter 9 of the carrier recovery loop 7.

The endless phase shifter (EPS) 9 of the carrier recovery loop 7 carries out complex-multiplier (phase rotation) of each signals output from the analog-to-digital converters 5 and 6 with a phase compensation signal (first compensation value) output from the numeric control oscillator 12, outputs a phase-compensated signal, and supplies the phase-compensated signal to the delay circuit 13 of the feed-forward phase compensation loop 8.

The phase detector (PD) 10 detects how much each output signals of the endless phase shifter 9 is shifted in phase to a predefined phase position in rectangular coordinate, and supplies the result (phase shift information) to the loop filter 11. Moreover, the phase detector 10 supplies the phase shift information also to the average circuit 14 of the feed-forward phase compensation loop 8.

The loop filter 11 suppresses a noise component contained in the phase shift information output from the phase detector 10, and supplies an automatic-phase-control (APC) value to the numerical control oscillator 12.

The numerical control oscillator (NCO) 12 converts the APC value output from the loop filter 11 into a phase compensation value $\Theta$ (first compensation value), supplies the values $\Theta$ (phase compensation values; $\sin \Theta$ and $\cos \Theta$) to the endless phase shifter 9.

The delay circuit (DELAY) 13 of the feed-forward phase compensation loop 8 supplies the signal which has delayed only the predetermined delay time required in order that the phase detector 10 may detect a phase shift and the numerical control oscillator 12 may output the values $\Theta$ to the endless phase shifter 16.

Figure 2:
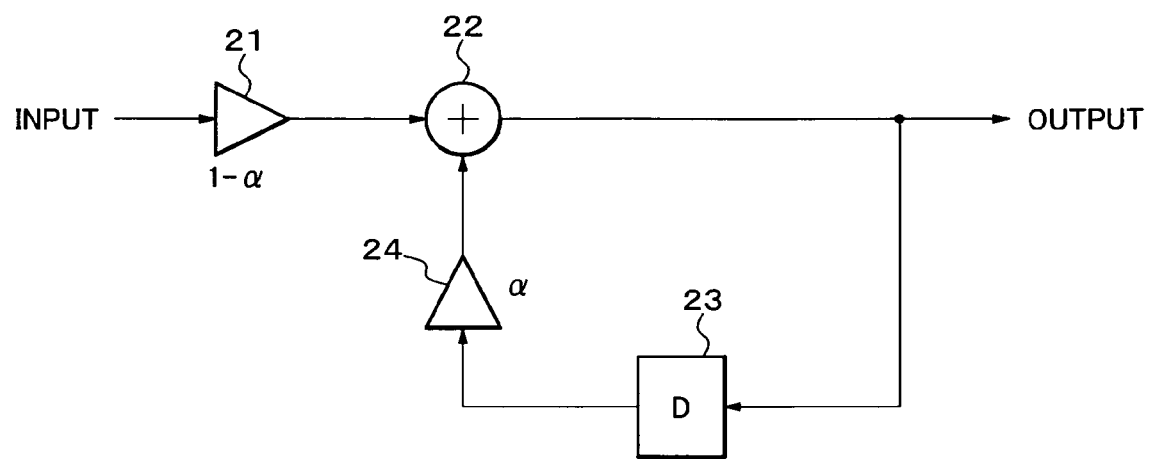
FIG. 2 is a block diagram showing a structure of an average circuit using in the demodulator shown in FIG. 1.

Next, a description will be given in detail of structure of an average circuit shown in FIG. 1. FIG. 2 is a block diagram showing a structure of an average circuit using in the demodulator shown in FIG. 1.

The average circuit 14 includes a gain amplifier 21, an accumulator 22, a delay circuit 23, and a gain amplifier 24, as shown in FIG. 2.

The average circuit 14 adds an output signal of the gain amplifier 21 which double the received signal with $(1-\alpha)$ (parameter $\alpha$ is a right number smaller than "1") and an output signal of the gain amplifier 24 by the accumulator 22, delays the added output signal only a predetermined period, and supplies a signal which double the delayed signal with the parameter $\alpha$ by the gain amplifier 24 to the accumulator 22.

A responsivity of the average circuit 14 is determined by the parameter $\alpha$ of the gain amplifiers 21 and 24, and it is known that the phase fluctuation is averaged over a long period (responsivity of loop becomes slow) while the parameter $\alpha$ becomes close to "1".

Since a noise component in a output signal of the phase detector 10 is converged on "0" by averaging procedure, the noise component output from the phase detector 10 can be fully suppressed by the averaging procedure included in this loop.

The numerical control oscillator 15 converts an averaged phase shift information output from the average circuit 14 into a phase compensation value Φ (second compensation value), and supplies the values Θ (phase compensation values; sin Φ and cos Φ) to the endless phase shifter 16.

The endless phase shifter 16 adds phase rotation to the signal in which time adjustment was carried out by the delay circuit 13 with the phase compensation values sin Φ and cos Φ, and outputs signals of Ich (I-channel) and Qch (Q-channel), respectively.

For details of the quadrature detector 1 and the endless phase shifters 9 and 16, they are well known to those skilled in the art, and will be omitted here.

Next, a description will be given in detail of compensation operation according to the exemplary embodiment of the present invention.

The quadrature detector 1 multiplies the received signal by an output signal of the local oscillator 2, and outputs quadrature signals of in-phase CH and quadrature-phase CH.

The low-pass filters 3 and 4 eliminate an unnecessary high frequency components contained in an output signal of the quadrature detector 1, and extract the base-band signals of Ich and Qch.

The analog-to-digital converters 5 and 6 convert the received baseband signals into digital signals, and supply the digital signals to the endless phase shifter 9 which constitutes the carrier recovery loop 7.

Here, although the local oscillation frequency of the local oscillator 2 is almost equal to the carrier frequency of the received signal, they are not completely in phase. For this reason, the phase rotation according to these frequency differences remains in the base-band signal. If the phase rotation remains, a transmitting data cannot be recovered correctly. Consequently, the carrier recovery loop 7 eliminates this phase rotation by following operation.

First, the endless phase shifter 9 adds a phase rotation to the demodulated received signal with the phase compensations sin Θ and cos Θ output from the numerical control oscillator 12. The phase detector 10 detects how much an output signal of the endless phase shifter 9 is shifted from a predefined phase position in rectangular coordinate, and supplies the result (phase shift information) to the loop filter 11.

The loop filter 11 suppresses a noise component in the phase shift information output from the phase detector 10, and supplies the APC value to the numeric control oscillator 12. The numeric control oscillator 12 converts the APC value output from the loop filter 11 into the phase compensation values sin Θ and cos Θ, and supplies the values to the endless phase shifter 9.

According to the loop composition explained above, if responsivity to the received signal is slow (loop bandwidth is narrow), a phase fluctuation included in the base-band signal, in particular, a phase fluctuation by the frequency difference between a career frequency and a local oscillation frequency can be eliminated.

Next, the feed-forward phase compensation loop 8 suppresses a quick phase fluctuation which cannot be eliminated by the carrier recovery loop 7 as follows.

The phase detector 10 detects the phase shift included in an output signal of the endless phase shifter 9, and supplies the phase shift information to the average circuit 14. The average circuit 14 takes an average of an output signal of the phase detector 10, as a corollary, suppresses the noise component contained in an output signal of the phase detector 10 and supplies the phase shift information after averaging to the numerical control oscillator 15.

The numerical control oscillator 15 converts the averaged phase shift information output from the average circuit 14 into the phase compensation value Φ, and supplies the phase compensation values (sin Φ and cos Φ) to the endless phase shifter 16.

The delay circuit 13 delays an: output signal of the endless phase shifter 9 until the phase compensation values sin Φ and cos Φ are output to the endless phase shifter 16, and supplies the delayed signal to the endless phase shifter 16.

The endless phase shifter 16 adds phase rotation only of Φ to an output signal of the delay circuit 13 by the phase compensation values sin Φ and cos Φ output from the numerical control oscillator 15.

In this feed-forward phase compensation loop 8, the quick phase fluctuation which cannot be eliminated by the carrier recovery loop 7 can be eliminated by being set up more quickly (loop bandwidth is wide) than the responsivity of the carrier recovery loop 7.

According to composition of the exemplary embodiment of the present invention explained above, each of the carrier recovery loop 7 and the feed-forward phase compensation loop 8 of cascade arrangement can be set as proper loop bandwidth in order to suppress both the carrier jitter and the rapid phase fluctuation which occurs at the time of line switching.

Figure 3:
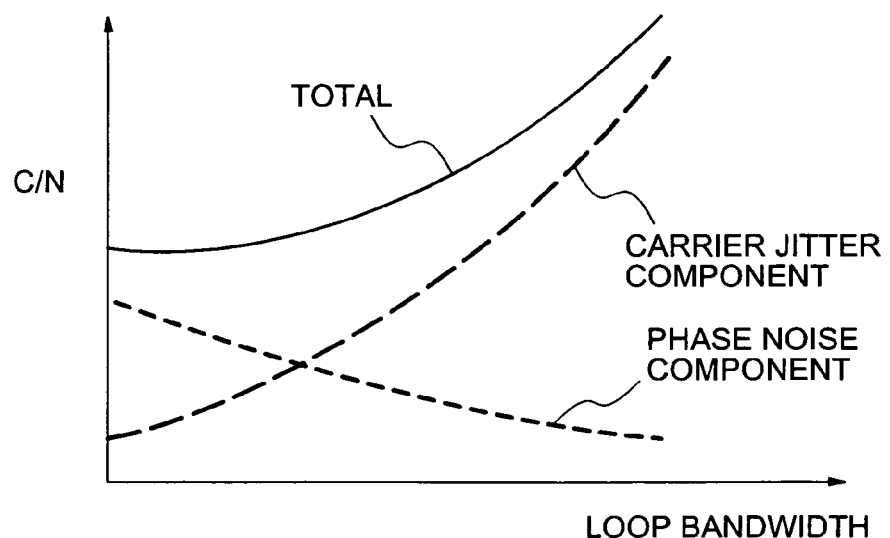
FIG. 3 is a diagram showing a relation between loop bandwidth and carrier-to-noise power ratio (C/N) in carrier synchronous operation limit.
Figure 4:
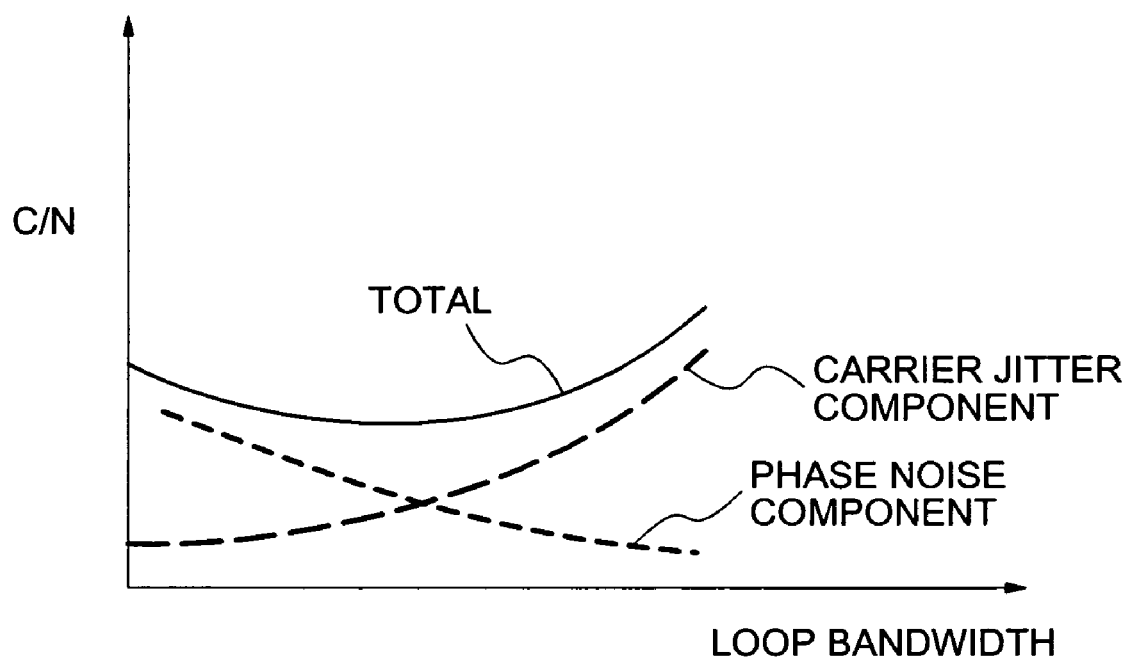
FIG. 4 is a diagram showing a relation between loop bandwidth and carrier-to-noise power ratio (C/N) in bit error rate (BER) characteristic.

First, as shown in FIGS. 3 and 4, the carrier recovery loop 7 is set to the loop bandwidth that may minimize the total amount of degradation. In this way, when loop bandwidth is set wide, there is an effect to suppress degradation by carrier jitter which has large influence.

Next, the feed-forward phase compensation loop 8 is set up the wide loop bandwidth more than that of the carrier recovery loop 7, so that a rapid phase fluctuation which occurs at the time of line switching is suppressed. At this time, the phase noise incidental on phase detector itself as is common in the conventional technology is suppressed by the average circuit 14 connected to the output terminal of the phase detector 10.

Therefore, the loop bandwidth of the feed-forward phase compensation loop 8 can be appropriately set up also to setting conditions, such as line switching time, without taking the noise component of the phase detector 10 itself into consideration.

Thereafter, by the carrier recovery loop 7 which minimizes the total amount of degradation shown in FIGS. 3 and 4 and the feed-forward phase compensation loop 8 which eliminates a rapid phase fluctuation, even when C/N is poor, lost synchronization of a carrier or degradation of BER can be prevented, and furthermore, a demodulation error can be reduced.

In recent years, it is conspicuous to adopt a synthesizer as a local oscillator for the purpose of variable frequency of carrier or cost reduction. However, phase noise of the synthesizer is comparatively large, it gives a large phase fluctuation to a base-band signal. Even in such a case, since this embodiment of the present invention is applicable, tan adjustable setting of carrier frequency or cost reduction are realizable.

Figure 5:
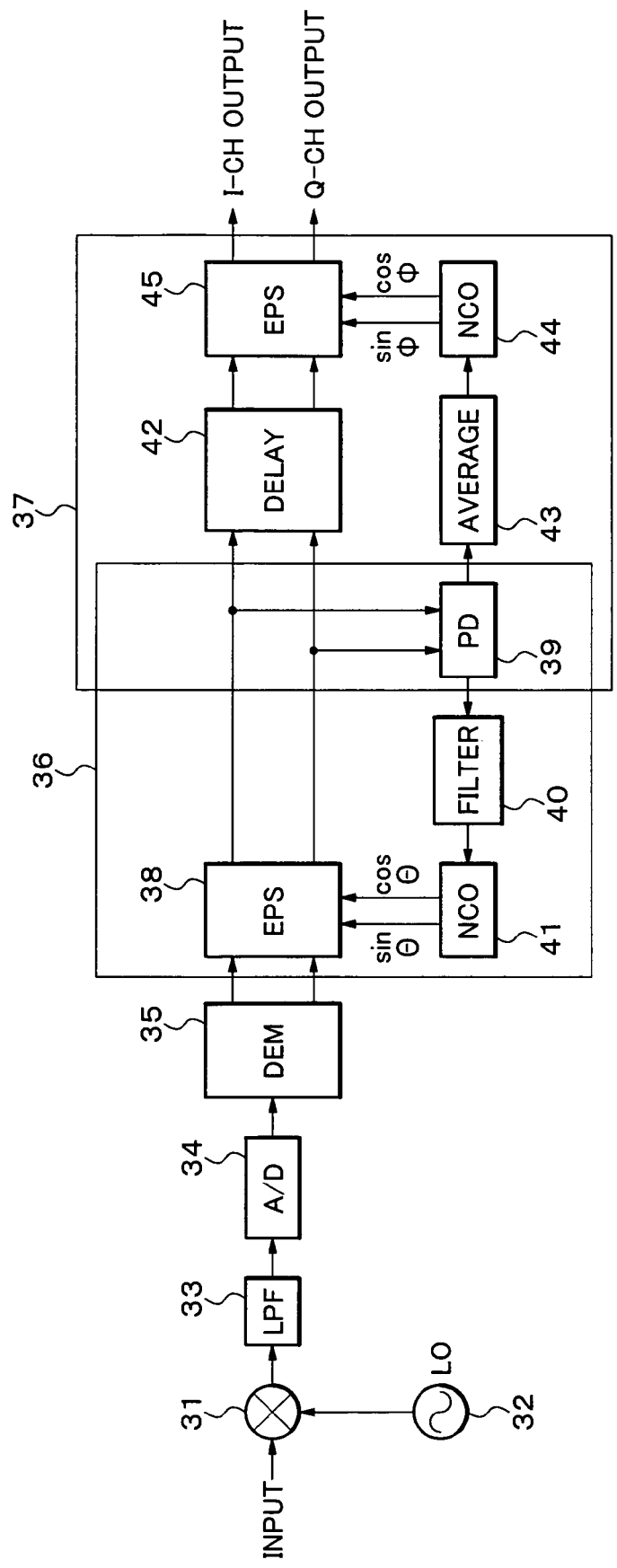
FIG. 5 is a block diagram showing a structure of a demodulator according to other exemplary embodiment of the present invention.

Next, a description will be given in other exemplary embodiment of the present invention with reference to the accompanying drawing. FIG. 5 is a block diagram showing a structure of a demodulator according to other exemplary embodiment of the present invention.

Referring to FIG. 5, the demodulator according to the other exemplary embodiment of the present invention includes a mixer (MIX) 31, a local oscillator (LO) 32, a low-pass passage filter (LPF) 33, an analog-to-digital converter (A/D) 34, a quadrature detector (DEM) 35, a carrier recovery loop, 36, and a feed-forward phase compensation loop 37.

As shown in FIG. 5, the demodulator of this embodiment is the composition which converts the received signal into a digital signal in IF frequency. Consequently, the demodulator of this embodiment differs from the demodulator shown in FIG. 1 which converts an IF received signal into a base-band signal and subsequently converts into a digital signal.

Here, since a composition and operation of the carrier recovery loop 36 and the feed-forward phase compensation loop 37 are the same as the carrier recovery loop 7 and the feed-forward phase compensation loop 8 shown in FIG. 1, detailed explanation is omitted.

While this invention has been described in connection with certain exemplary embodiments, it is to be understood that the subject matter encompassed by way of this invention is not to be limited to those specific embodiments. On the contrary, it is intended for the subject matter of the invention to include all alternative, update, and equivalents as can be included within the spirit and scope of the following claims.

Further, the inventers' invention is to retain all equivalents of the claimed invention even if the claims are amended during prosecution.

What is claimed is:

1. A demodulator comprising:
a carrier recovery loop which receives a digital signal after a semi-synchronous detection, detects a phase shift of the digital signal to a predefined phase position, and compensates for a phase of the digital signal by a first compensation value on the basis of the detected phase shift to generate an output signal; and
a feed-forward phase compensation loop which generates an average value of the detected phase shift, and compensates for a phase of a signal output from the carrier recovery loop by a second compensation value on the basis of the averaged phase shift, wherein the carrier recovery loop has a first loop bandwidth with a slow responsivity to the digital signal so that the phase of the digital signal is compensated, and the feed-forward phase compensation loop has a second loop bandwidth with a quick responsivity to the digital signal compared with the carrier recovery loop.

2. The demodulator according to claim 1, wherein the carrier recovery loop comprises:
a phase detector which detects the phase shift of the digital signal to the predefined phase position;
a first numerical control oscillator which generates the first compensation value corresponding to the detected phase shift; and
a first endless phase shifter which compensates for the phase of the digital signal by a sine wave signal and a cosine wave signal on the basis of the first compensation value.

3. The demodulator according to claim 1, wherein the feed-forward phase compensation loop comprises:
a average circuit which averages the detected phase shift over a predetermined period average;
a second numerical control oscillator which generates the second compensation value corresponding to the averaged phase shift; and
a second endless phase shifter which compensates for the phase of the output signal from the carrier recovery loop by a sine wave signal and a cosine wave signal on the basis of the second compensation value.

4. A phase compensation method of a demodulator, the method comprising:
detecting a phase shift of a received digital signal after a semi-synchronous detection to a predefined phase position;
compensating for a phase of the received digital signal by a first compensation value on the basis of the detected phase shift to generate an output signal;
averaging an value of the detected phase shift; and
compensating for a phase of a signal compensated with the first compensation value by a second compensation value on the basis of an averaged values,
wherein the first compensation value is generated and used in a carrier recovery loop which has a first loop bandwidth with a slow responsivity to the received digital signal so that the phase of the received digital signal is compensated, and the second compensation value is generated and used in a feed-forward phase compensation loop which has a second loop bandwidth with a quick responsivity to the received digital signal compared with the carrier recovery loop.

5. A demodulator comprising:
a quadrature detector which converts a received signal to base-band signals of in-phase channel and quadrature-phase channel with multiplying by a local oscillation frequency;
low-pass filters which eliminate high frequency components more unnecessary from the base-band signals;
analog-to-digital converters (A/D) which convert the base-band signals after filtering into digital signals;
a carrier recovery loop which detects a phase shift of the digital signals to a predefined phase position, and compensates for a phase of the digital signal by a first compensation value on the basis of the detected phase shift to generate an output signal; and
a feed-forward phase compensation loop which generates an average value of the detected phase shift, and compensates for a phase of a signal output from the carrier recovery loop by a second compensation value on the basis of the averaged phase shift, wherein the carrier recovery loop has a first loop bandwidth with a slow responsivity to the digital signal so that the phase of the digital signals is compensated, and the feed-forward phase compensation loop has a second loop bandwidth with a quick responsivity to the digital signal compared with the carrier recovery loop.

6. The demodulator according to claim 5, wherein the cater recovery loop comprises:
a phase detector which detects the phase shift of the digital signal to the predefined phase position;
a first numerical control oscillator which generates the first compensation value corresponding to the detected phase shift; and
a first endless phase shifter which compensates for the phase of the digital signal by a sine wave signal and a cosine wave signal on the basis of the first compensation value.

7. The demodulator according to claim 5, wherein the feed-forward phase compensation loop comprises:
a average circuit which averages the detected phase shift over a predetermined period average;
a second numerical control oscillator which generates the second compensation value corresponding to the averaged phase shift; and
a second endless phase shifter which compensates for the phase of the output signal from the carrier recovery loop by a sine wave signal and a cosine wave signal on the basis of the second compensation value.

* * * * *